United States Patent [19]

Kamimura

[11] 4,006,751

[45] Feb. 8, 1977

[54] METHOD AND APPARATUS FOR ROTATING HYDRAULIC CONTROL RODS

[75] Inventor: Toshio Kamimura, Gifu, Japan

[73] Assignee: Teijin Seiki Co., Ltd., Osaka, Japan

[22] Filed: Nov. 12, 1975

[21] Appl. No.: 631,397

[30] Foreign Application Priority Data

Mar. 11, 1975 Japan .............................. 50-29734

[52] U.S. Cl. .................................... 137/1; 137/331

[51] Int. Cl.[2] .......................................... F16K 29/00

[58] Field of Search .............. 137/330, 331, 332, 1, 137/243-243.7

[56] References Cited

UNITED STATES PATENTS

| | | | |
|---|---|---|---|
| 1,908,396 | 5/1933 | Albright | 137/331 |
| 3,159,173 | 12/1964 | Fremon | 137/331 |
| 3,504,696 | 4/1970 | McCurley | 137/331 |

*Primary Examiner*—Alan Cohan
*Assistant Examiner*—Richard Gerard
*Attorney, Agent, or Firm*—Haseltine, Lake & Waters

[57] ABSTRACT

A method and an apparatus for imparting rotational movement to a control rod which is reciprocably inserted in a hydraulic circuit for controlling flows of fluid pressure from a pressure source to an actuator, wherein the operating fluid pressure is by-passed to a rotating mechanism which is disengageably associated with one end of the control rod, thereby driving the rotating mechanism to engage and rotate the control rod through a certain angle upon actuation of the hydraulic circuit.

4 Claims, 3 Drawing Figures

METHOD AND APPARATUS FOR ROTATING HYDRAULIC CONTROL RODS

This invention relates to hydraulic control systems, and more particularly to a method and an apparatus for operating a control rod which controls pressure flows in a hydraulic circuit.

In general, it is conventional practice to employ a control rod in a hydraulic or fluid circuit to control pressure flows to an actuator. The control rod is connected to a spool valve which is ordinarily reciprocated back and forth without accompanying any rotational movement. As a result, certain surface areas of the lands of the spool valve are worn out and damaged due to continued or repeated exposure to the fluid pressure and the spool becomes incapable of performing initially intended functions within a short period of time, requiring frequent replacements.

It is an object of the present invention to eliminate a above-mentioned difficulty. The more specific object of the invention is to provide a method and apparatus for imparting rotational movement to a control rod upon actuation of the fluid circuit.

It is another object of the invention to provide a method and an apparatus of the nature just mentioned, by by-passing the operating fluid pressure to drive a rotating mechanism which is disengageably associated with one end of the control rod.

According to the invention, there is provided a method of imparting rotational movement to a control rod which is inserted reciprocably in a hydraulic circuit to control flows of fluid pressure from a pressure source to an actuator, the method comprising; providing a rotating mechanism in disengageable association with one of the control rod; and driving the rotating mechanism to engage and rotate the control rod at a suitable time point during operation of the hydraulic circuit.

Preferably, the operating fluid of the hydraulic circuit is by-passed to the rotating mechanism thereby to drive the rotating mechanism to engage and rotate the control rod upon actuation of the hydraulic circuit.

According to the invention, there is also provided an apparatus for carrying out the method mentioned above, the apparatus comprising; a rotating mechanism disengageably associated with one end of the control rod; and means for driving the rotating mechanism to engage and rotate the control rod at a suitable time point during operation of the hydraulic circuit.

In one specific form of the invention, the apparatus comprises a by-pass passage branched off a fluid supply passage between the fluid source and the control rod and led to the rotating mechanism to supply the operating fluid pressure thereto, and the rotating mechanism includes collet means rotatably mounted around one end of the control rod and movable into and out of engagement with the control rod, and a piston cylinder having first and second piston members relatively movable under the influence of the operating fluid pressure for rotatingly engaging the collet means with one end of the control rod upon actuation of the hydraulic circuit.

The above and other objects, features and advantages of the invention will become clear from the following description and the appended claims, taken in conjunction with the accompanying drawings which show by way of example a preferred embodiment of the invention.

Figure 2:
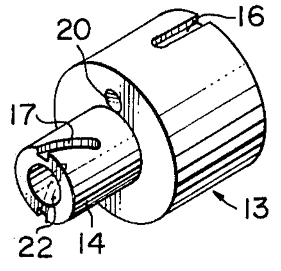
FIG. 2 is a diagrammatic perspective view of an outer piston employed in the device of FIG. 1.
Figure 3:
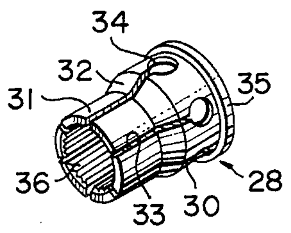
FIG. 3 is a diagrammatic perspective view of a collet member.

Referring to the accompanying drawings, the hydraulic control device embodying the present invention includes a casing 1 for rotatably and reciprocably accommodating a control rod 2 in the form of a spool valve with lands 40, 40' and 40''. One end of the control rod 2 is projected into a chamber 3 which is provided at one end of the casing 1. The control rod 2 is provided at the projected end with a pair of annular flanges 4 and 4' opposingly at a predetermined distance from each other to form therebetween a groove for pivotally holding a rounded end of an output lever 5. The other end of the output lever 5 is fixedly supported on a shaft 6 which is rotatably mounted in the casing 1. Also fixedly supported on the rotatable shaft 6 is one end of an input lever 7 the other end of which is reciprocable by means of a control rod actuator (not shown). The casing 1 is provided at the other end with a chamber 8 into which the other end of the control rod 2 is extended, the extended end control rod 2 having a number of axial grooves 9 around the circumference thereof. The casing 1 is further provided on the outer side of the chamber 8 with a bore 10 and a chamber 12, the bore 10 being of a diameter smaller than the chambers 8 and 12 to provide a radially inwardly projecting wall or shoulder 11. A stepped outer piston 13 is slidably received in the chamber 12 for axial movement therein. The smaller diameter portion 14 of the piston 13 is slidably mounted in the bore 10. As shown in FIG. 2, the piston 13 has an axial groove 16 on the circumference of its larger diameter portion for receiving a pin member 15 which is projected inwardly from the wall of the chamber 12. A number of helical grooves 17 are provided on the circumference of the smaller diameter portion 14 of the piston 13 for engagement with inner projections of a collet ring which will be discussed hereinlater. The outer piston 13 is internally provided with an axial chamber 18 and a recess 19 which is coaxial with but of a smaller diameter than the chamber 18. A passage 20 is formed through the wall of the piston 13 to communicate the chamber 18 with a line led from outside. A compression spring 21 is mounted in the chamber 12 to urge the piston 13 toward the control rod 2. The smaller diameter portion 14 of the outer piston 13 is internally provided with an axial bore 22 in communication with the chamber 18. A secondary or inner piston 24 is slidably mounted in the chamber 18 of the outer piston 13 with a rod portion 23 in sliding engagement with the axial bore 22. A collar 26 is rotatably mounted at the fore end of the rod portion of the inner piston 24 by means of bearings 25. The inner piston 24 is provided with a constricted passage 27 which communicates the chamber 18 with the recess 19. A hollow cylindrical collet 28 which is formed from a resilient metal is mounted rotatably in the chamber 8 by means of bearings 29. The collet 28 has a larger diameter portion 30 surrounding the circumference of the smaller diameter portion of the outer piston 13, a smaller diameter portion 31 surrounding the circumference of the inner end of and having an inner diameter slightly smaller than the outer diameter of the control rod 2, and a tapered portion interconnecting the larger and smaller diameter portions 30 and 31, as shown in FIG. 3. A number of grooves 33 are provided axially along the smaller diameter portion 31, tapered portion 32 and larger diameter portion 30 of the collet 28 at uniform intervals around the circumference thereof. The inner ends of the axial grooves 33 terminate in circular appertures 34 which are formed in the circumference of the larger diameter portion 30. The larger diameter portion 30 is provided at its outer end with an annular ring 35 which has an outer periphery radially outwardly projected from the circumference of the larger diameter portion 30 and held between the afore-mentioned bearing 29 and the shoulder 11. The ring 35 has a number of radial projections on its inner periphery for engagement with the helical grooves 17 in the smaller diameter portion 14 of the outer piston 13. The collet 28 is provided with a number of axial protuberances on the inner wall surfaces of the smaller diameter portion 31 for meshing engagement with axial grooves 9 which are provided opposingly at the inner end of the control rod 2. The casing 1 further includes a fluid supply passage 38 and a drain passage 37. The fluid supply passage 38 is in communication with the chamber 12 through a by-pass passage 39. The two outlets of the control valve are in fluid communication with opposite working chambers of an actuator 42 with a piston 43 which has piston rods 44 and 44′ secured to the opposite sides thereof in the usual manner.

Figure 1:
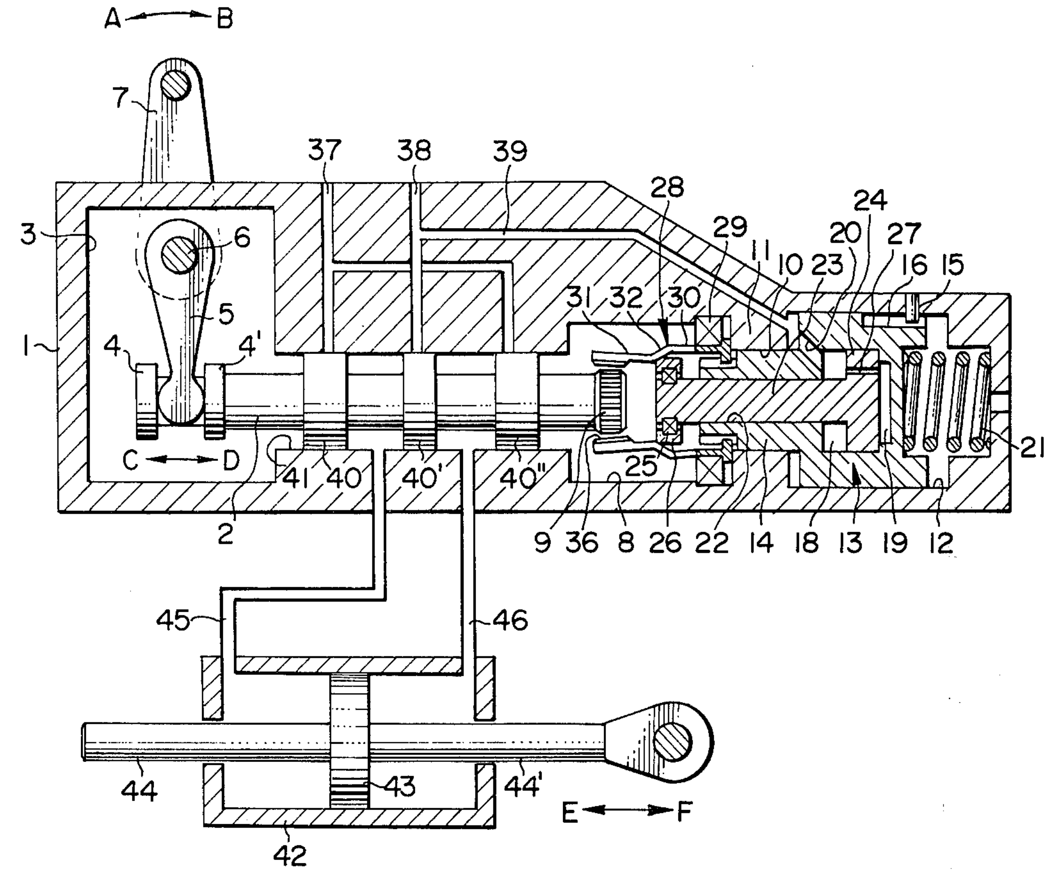
FIG. 1 is a diagrammatic sectional view of a hydraulic control device embodying the instant invention.

In operation, when the fluid circuit is inactive, that is to say, when no fluid pressure is supplied to the passage 38, the protuberances 36 of the collet 28 are disengaged from the grooves 9 on the control rod 2 as shown in FIG. 1. Under these circumstances, the outer piston 13 is urged toward the control rod 2 by the action of the compression spring 21 while the piston rod 23 of the inner piston 24 is pushed outward or to the right in FIG. 1 by the tapered portion 32 of the collet 28 through the bearing 26, holding the inner piston 24 is the retracted position relative to the control rod 2 as shown in FIG. 1. Upon supplying operating fluid pressure to the supply passage 38 by operation of the fluid circuit, the fluid pressure is introduced to the inner spaces of the chamber 12 through the by-pass passage 39 to act on the shoulder of the outer piston 13 and move the outer piston outwardly or to the right in FIG. 1 against the action of the spring 21. The fluid pressure introduced into the chamber 12 is led into the chamber 18 through the passage 20, pushing to the right the inner piston 24 together with the outer piston 13, piston rod 23 and collar 26. Whereupon, the collar 26 is disengaged from the tapered portion 32 of the collet 28 and as a result the protuberances 36 of the collet 28 are allowed to mesh with the grooves 9 on the control rod 2. As the outer piston 13 is moved to the right together with the inner piston 24, the collet 28 is caused to rotate through a certain angle due to the engagement of the inner projections of the ring 35 with the helical grooves 17, and the rotation of the collet 28 is transmitted to the control rod 2 through the internal protuberances 36 and the grooves 9. In this instance, rotation of the outer piston 13 is blocked by the pin member 15 which is in engagement with the axial groove 16 of the outer piston 13. The fluid pressure introduced into the chamber 18 then enters the recess 19 through the passage 27 in the inner piston 24 and acts to push the inner piston 24 inwardly or to the left at a suitable time lag due to the constricting effects of the passage 27, thereby urging the collar 26 into engagement with the tapered portion 32 of the collet 28 to disengage the protuberances 36 of the collet 28 from the grooves 9 of the control rod 2.

The input lever 7 is rockable in the directions of arrows A and B by suitable means which is not shown to move the control rod 2 in the direction of either arrow C or D through the rotary shaft 6 and output lever 5. If the control rod is moved in the direction of arrow D, lands 40, 40′ and 40″ are also moved in the direction D, allowing the fluid pressure in the supply passage 38 to enter the spool bore 41 and then into the cylinder 42 through passage 45 while discharging the fluid pressure in the opposite working chamber of the cylinder 42 through passage 46 and drain passage 37. As a result, the piston 43 and piston rods 44 and 44′ are moved in the direction of arrow F to actuate a mechanical operating element which is linked to the piston rod 44 though not shown. If the control rod 2 is moved in the direction C, the lands 40, 40′ and 40″ are also moved in the same direction, allowing the operating fluid pressure in the supply passage 38 to enter the spool bore 41 and then into the working chamber of the cylinder 42 through the fluid passage 46 while discharging the fluid pressure in the opposite working chamber through the fluid passage 45 to the drain passage 37. As a result, the piston 43 and piston rods 44 and 44′ are moved in the direction E to actuate the mechanical operating element in a reverse direction.

Upon completion of the operation of the mechanical element, the supply of the operating fluid pressure is cut off. As a result, the outer piston 13 is moved to the left by the action of the spring 21 but the control rod 2 maintains the position shown in FIG. 1 and would not rotate even if the collet 28 were rotated by engagement with the helical grooves 17 since the protuberances 36 of the collet 28 are kept away from the grooves 9 of the control rod 2 by the collar 26.

In this manner, the control rod 2 is rotated through a certain angle each time when the operating fluid pressure is supplied to the passage 38. If desired, the control rod may be rotated by electrical or mechanical means other than the particular arrangement shown and described herein by way of example.

It will be understood from the foregoing description that, according to the invention, the control rod 2 is rotated suitably to contact different surface areas of the spool with the operating fluid so that the spool may maintain unchanged performance quality over a long period of time without requiring early replacement as in the conventional counterparts.

What is claimed is:

1. A method for imparting rotational movement to a control rod which is inserted reciprocably in a hydraulic circuit to control flow of fluid pressure from a pressure source to an actuator, comprising:

providing a rotating mechanism in disengageable association with one end of said control rod;

driving said rotating mechanism to engage and rotate said control rod at a suitable time during operation of said hydraulic circuit; and, by-passing operating fluid pressure of said hydraulic circuit to said rotating mechanism, thereby driving said rotating mechanism to engage and rotate said control rod upon actuation of said hydraulic circuit.

2. An apparatus for imparting rotational movement to a control rod which is reciprocably inserted in a hydraulic circuit to control flow of operating fluid pressure from a pressure source t6 an actuator, comprising:

a rotating mechanism disengageably associated with one end of said control rod;

means for driving said rotating mechanism to engage and rotate said control rod at a suitable time during operation of said hydraulic circuit; and, a by-pass passage branched off from a fluid supply passage between said fluid pressure source and said control rod and leading to said rotating mechanism thereby to drive said rotating mechanism to engage and rotate said control rod upon actuation of said hydraulic circuit.

3. An apparatus according to claim 2, wherein said rotating mechanism comprises:

collet means rotatably mounted around one end of said control rod and movable into and out of engagement with said one end of said control rod; and said means for driving said rotating mechanism comprises a piston cylinder having first and second piston members relatively movable under the influence of said operating fluid pressure for rotatingly engaging said collet means with said one end of said control rod.

4. An apparatus according to claim 3, wherein said collet means has a generally cylindrical shape and is provided with a number of axial protuberances for engagement with axial grooves provided on said one end of said control rod upon actuation of said hydraulic circuit.

* * * * *